United States Patent
Ikeda

(10) Patent No.: US 9,182,909 B2
(45) Date of Patent: Nov. 10, 2015

(54) NUMBER KEYPAD

(75) Inventor: Akihiko Ikeda, Taipei (TW)

(73) Assignee: Hewlett-Packard Development Company, L.P., Houston, TX (US)

( * ) Notice: Subject to any disclaimer, the term of this patent is extended or adjusted under 35 U.S.C. 154(b) by 387 days.

(21) Appl. No.: 13/095,144

(22) Filed: Apr. 27, 2011

(65) Prior Publication Data

US 2012/0274579 A1 Nov. 1, 2012

(51) Int. Cl.
  *G06F 3/0488* (2013.01)
  *G06F 3/0486* (2013.01)

(52) U.S. Cl.
  CPC .......... *G06F 3/04886* (2013.01); *G06F 3/0486* (2013.01)

(58) Field of Classification Search
  CPC ... G06F 3/0488; G06F 3/04883; G06F 3/044; G06F 3/04886; G06F 3/0486
  USPC .................. 345/156–179; 178/18.01
  See application file for complete search history.

(56) References Cited

U.S. PATENT DOCUMENTS

| 6,597,345 B2 * | 7/2003 | Hirshberg | 345/168 |
| 8,769,427 B2 * | 7/2014 | Raman et al. | 715/773 |
| 2006/0033723 A1 * | 2/2006 | Maw | 345/173 |
| 2006/0187211 A1 | 8/2006 | Uusitalo et al. | |
| 2007/0013662 A1 | 1/2007 | Fauth | |
| 2007/0236474 A1 * | 10/2007 | Ramstein | 345/173 |
| 2008/0291171 A1 * | 11/2008 | Shin et al. | 345/168 |
| 2009/0243897 A1 * | 10/2009 | Davidson et al. | 341/22 |
| 2010/0041480 A1 | 2/2010 | Wong et al. | |
| 2010/0070931 A1 * | 3/2010 | Nichols | 715/863 |
| 2010/0156796 A1 | 6/2010 | Kim et al. | |
| 2011/0083104 A1 * | 4/2011 | Minton | 715/815 |
| 2012/0044175 A1 * | 2/2012 | Cho | 345/173 |
| 2012/0268393 A1 * | 10/2012 | Lee | 345/173 |
| 2012/0287051 A1 * | 11/2012 | Takabu | 345/169 |

OTHER PUBLICATIONS

Oliphant, Zan. Change your keyboard layout. PCMag.com Oct. 8, 2010.
Screen keyboard with customizable layouts and languages, a number of predefined themes. FPS Components. Oct. 8, 2010.
Xytor, Flash Virtual Piano, Online Video clip uploaded on Mar. 30, 2010. http://www.newgrounds.com/portal/view/531808.

* cited by examiner

*Primary Examiner* — Kumar Patel
*Assistant Examiner* — Mansour M Said
(74) *Attorney, Agent, or Firm* — HP Legal Department

(57) ABSTRACT

Embodiments provide methods, apparatuses, and articles of manufacture for arranging keys of a number keypad based on movement of another key. In various embodiments, a contact may be detected, and a key associated with the contact moved to a second location in accordance with movement of the contact. Based on the second location a second key may be arranged.

17 Claims, 6 Drawing Sheets

NUMBER KEYPAD

BACKGROUND

Touch sensitive displays (also known as "touch screens" or "touchscreens") are becoming more common in computing devices. Computing devices such as notebook computers, desktop computers, smart phones, and other portable and non-portable computing devices may utilize a touch sensitive display as a user interface. The touch sensitive display may be used to display a keyboard and/or a numerical keypad such as a ten key layout.

BRIEF DESCRIPTION OF THE DRAWINGS

FIGS. 7A-7L illustrate numerical keypad layouts in accordance with various embodiments;

DETAILED DESCRIPTION

Numerical keypads may utilize varying layouts. For example, a numerical keypad on a telephone may utilize a first layout where a numerical one "1" is located in the top left corner of the keypad and the remaining numbers are sequentially aligned from left to right and top to bottom with three numbers in each row. As another example, a numerical keypad on a keyboard associated with a computing device may utilize a second layout where a numerical one "1" is located in the bottom left corner of the keypad and the remaining numbers are sequentially aligned from left to right and bottom to top. These differing layouts may inhibit utilization by a user. Furthermore, the defined layouts may prevent a user from developing a user assigned layout.

In the present disclosure, methods, apparatus, and articles of manufacture are disclosed which enable a user to organize a numerical keypad layout. A user may interact with a touch sensitive display to align various numerical keys in a variety of manners. The interaction with the touch sensitive display may include one or more gestures to automatically align the numerical keys displayed on the touch sensitive display.

Figure 1:
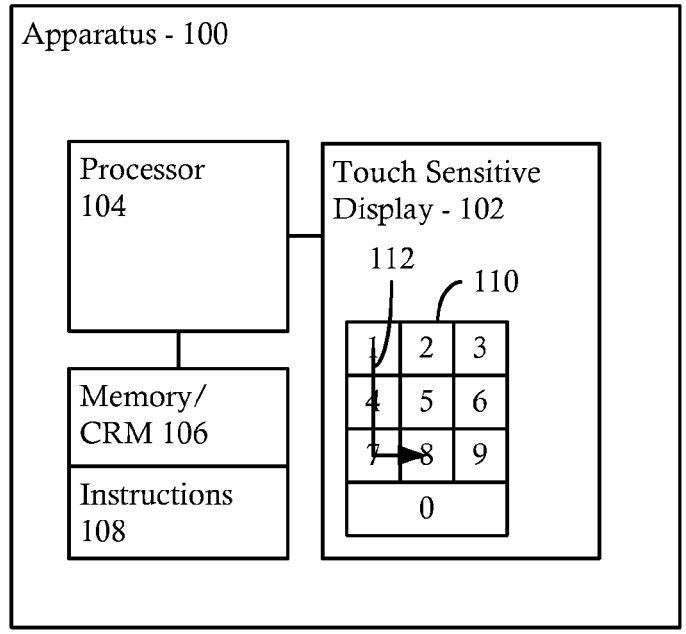
FIG. 1 illustrates an apparatus in accordance with an embodiment.

Referring to FIG. 1, an apparatus 100 is illustrated in accordance with an embodiment. The apparatus may be a computing device such as, but not limited to, a notebook computer, a desktop computer, a netbook, a tablet or slate computing device, a smart phone, a personal digital assistant, or a cash register. The apparatus 100 includes a processor 104, a memory 106 having a plurality of programming instructions stored thereon 108, and a touch sensitive display 102. The apparatus may include other components.

The apparatus 100 is configured to display a number keypad 110 on the touch sensitive display 102. A number keypad 110 may be a keypad configured for entry of numeric characters. The number keypad may be a ten key layout having three rows and three columns of numbers representing numerical characters: one, two, three, four, five, six, seven, eight, and nine. The three rows and three columns of numeric characters may be aligned in any order. In addition, the ten key layout may have a tenth key representing the numeric character zero. The tenth key may be disposed on any side of the number keypad 110. As illustrated, the zero is disposed on the bottom of the ten key layout.

While the touch sensitive display 102 displays the ten key layout 102, it may also be configured to accept user input. The touch sensitive display may accept input from a user based on haptic and/or tactile contact. The touch sensitive display 102 comprises a touch sensitive surface that accepts user input. The touch sensitive display may be coupled to a processor 104 along with any associated modules and/or sets of programming instructions 108 in memory or computer readable medium 106.

The touch sensitive display 102 in combination with the processor 104 may detect contact, along with any movement or break of the contact, on touch sensitive display 102 and convert the detected contact into interaction with user interface objects, such as a numeric key displayed on the touch sensitive display 102. The touch sensitive display 102 may use liquid crystal display (LCD) technology or light emitting diode (LED) technology, although other display technologies are contemplated. The touch sensitive display 102 and the processor 104 may detect contact and any movement or break thereof using various touch sensitivity technologies including capacitive, resistive, infrared, and surface acoustic wave technologies, as well as other proximity sensor arrays or other elements for determining one or more points of contact with the touch sensitive display 102.

Memory 106 may include various types of memory and may be a non-transitory computer readable medium having a plurality of instructions stored thereon. Other computer readable mediums may include portable storage devices. The memory 106 may include high speed random access memory (RAM) and may also non-volatile memory, such as a magnetic disk storage device, flash memory, or other solid state memory devices.

The memory 106 may include instructions 108 which may be embodied in a programming language readable by a computing device such as processor 104. The processor 104 may be configured to load and run various software programs and or sets of instructions 108 to perform various functions for the apparatus 100.

In one example, the processor 104 may be coupled to the touch sensitive display 102 and the memory 106. The processor 104 may execute instructions 108, which enable the apparatus 100 to detect a contact with the touch sensitive display 102 at a first location. The first location may correspond to a first number key of a number keypad 110 displayed by the touch sensitive display 102. The apparatus 100 may move the first number key of the number keypad displayed on the touch sensitive display 102 in accordance with movement of the contact 112 to a second location that is different than the first location. Based on the direction of movement of the contact after the first key reaches the second location, the apparatus 100 may arrange a second number key of the number keypad 110. In this manner, a number keypad 110 displayed on a touch sensitive display 102 may be efficiently rearranged with a gesture.

Referring to FIGS. 2-5, an apparatus 200 is illustrated in accordance with an embodiment. The apparatus 200 is a device similar to that described with reference to FIG. 1. Other components may be included without deviating from the scope of the disclosure.

Figure 2:
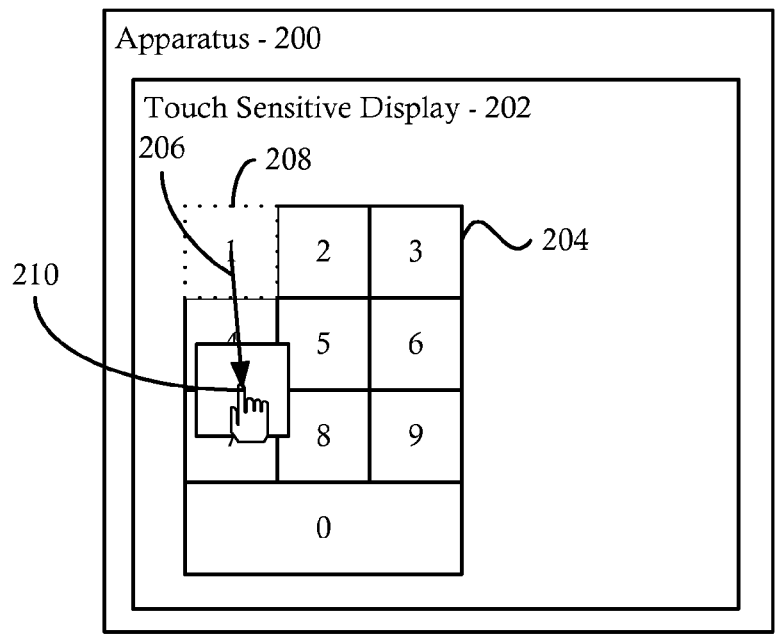
FIG. 2 illustrates an apparatus in accordance with an embodiment.

In FIG. 2, touch sensitive display 202 has displayed a number keypad 204 having a first layout. The first layout may be similar to a layout associated with, for example, a telephone. More specifically, the number keypad 204 may have a key representing a numeric one in an upper left corner of the number keypad and sequentially align numbers two through nine from left to right and top to bottom.

The apparatus 200 may detect a contact 210 with the touch sensitive display 202 at a first location 208, wherein the first location 208 corresponds to a first number key of number keypad 204 displayed on the touch sensitive display 202. The first location is in the upper left corner of the number keypad 204. In various embodiments, the contact 210 may associated with an area that corresponds to the first number key. That is, a contact may be determined to be within the area designated as the first numeric key. While the first location is illustrated as corresponding to a number key corresponding to a numeric one, other number keys are contemplated.

The apparatus 200 may continue to monitor the contact 210 and move the first number key of the number keypad displayed on the touch sensitive display 202 in accordance with movement of the contact to a second location, as illustrated by arrow 206. In other words, the movement of the first number key mirrors the movement of a user's contact with the touch sensitive display 202. The second location is different than the first location, and as illustrated, is in a lower, left corner of the number keypad 204 displayed on the touch sensitive display 202. In various embodiments, an algorithm may be utilized to determine to which corner of the number keypad 204 the contact 210 is closer, and in response, determine the second location. The movement of the contact 210 to the second location may follow an undefined path, or alternatively, may follow a predefined path.

Figure 3:
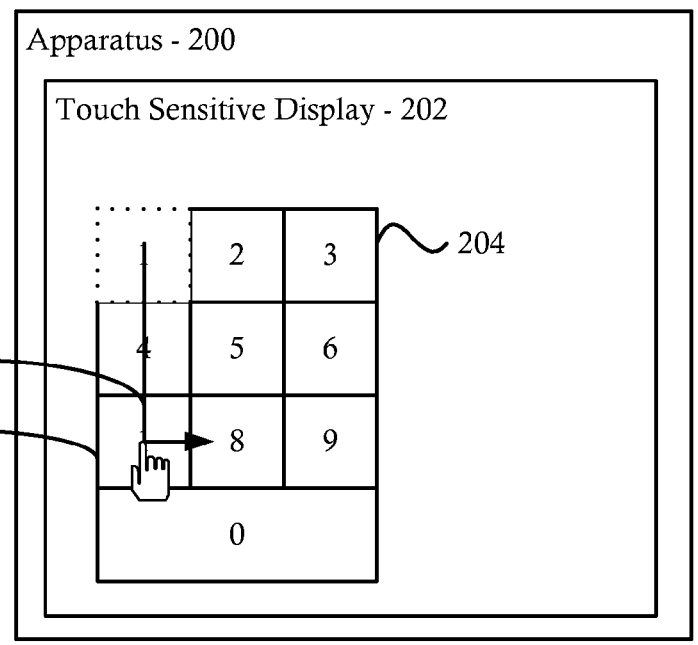
FIG. 3 illustrates an apparatus in accordance with an embodiment.

Referring to FIG. 3, the first number key has reached the second location 212. In response to the first number key reaching the second location 212, the apparatus 200 may arrange a second number key of the number keypad based on a direction of movement of the contact 210. For example, as illustrated, the direction of movement of the contact 210 after the first number key has arrived at the second location 212 is to the right. Consequently, a second number key, the number key representing the number two, may be moved adjacent to the first number key on a side corresponding to the direction of movement.

Figure 4:
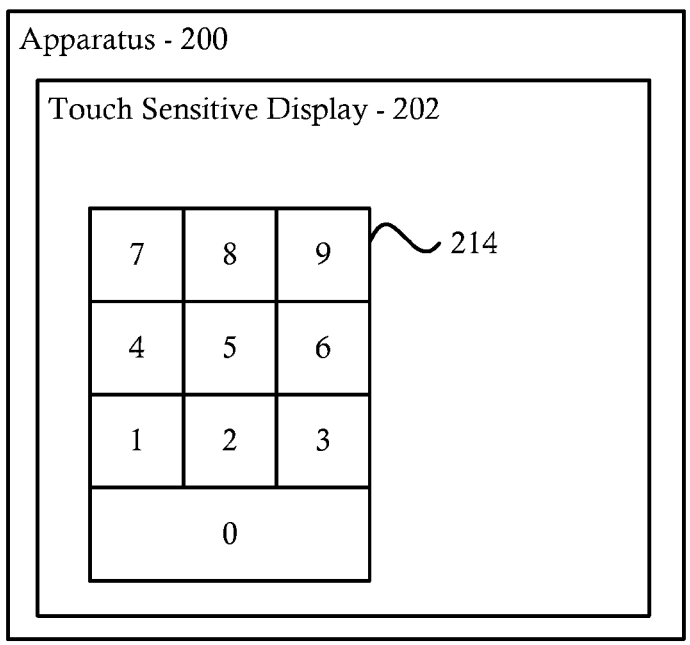
FIG. 4 illustrates an apparatus in accordance with an embodiment.

As seen in FIG. 4, any remaining number keys, for example, a second number key may be arranged by the apparatus 200 in a sequential order corresponding to the direction of movement of the contact after the first number key has reached the second position. In this manner, a number keypad 214 may be switched from a first layout to a second layout. In one example, the first number layout being a layout generally similar to that of a telephone and the second number layout being a layout generally similar to a keyboard of a computing device. Additionally, various other layouts may be utilized.

Figure 5:
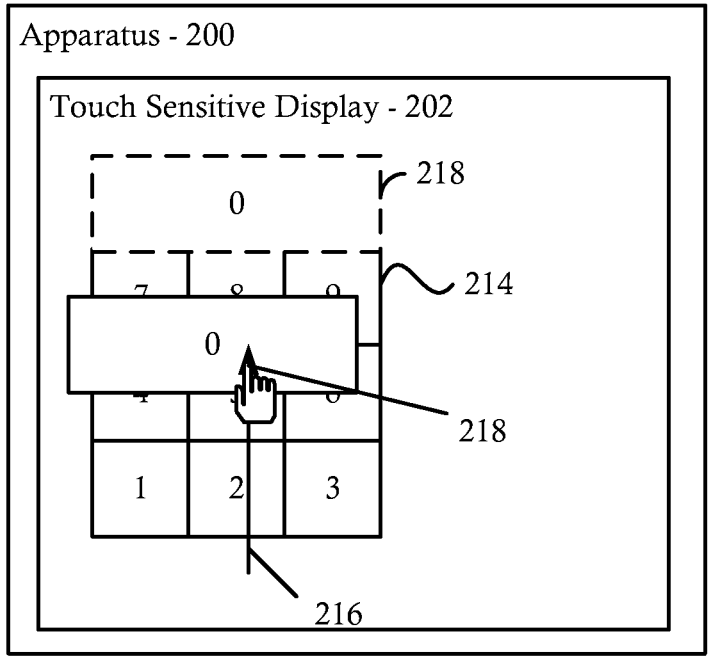
FIG. 5 illustrates an apparatus in accordance with an embodiment.

Referring to FIG. 5, the apparatus 200 may further detect another contact 218 with the touch sensitive display 202 at a third location, wherein the third location corresponds to a number key representing a numeric zero. The apparatus 200 may be configured to move the zero key on the touch sensitive display 202 in accordance with movement of the contact 218 to a fourth location 218, as illustrated by arrow 216. Detecting contacts, in various embodiments, may include detecting contact with the touch sensitive display 202 for a period of time, for example, longer than two seconds. In this manner, the apparatus 200 may differentiate a press of the button with an action intended to reorganize the keypad. In various embodiments, the zero key may be moved to various positions independent of the other number keys. The zero key may be moved to the bottom, right, left, or top side of the number keypad 214, or alternatively, may be moved to a non-contiguous position with respect to the number keypad 214.

Figure 6:
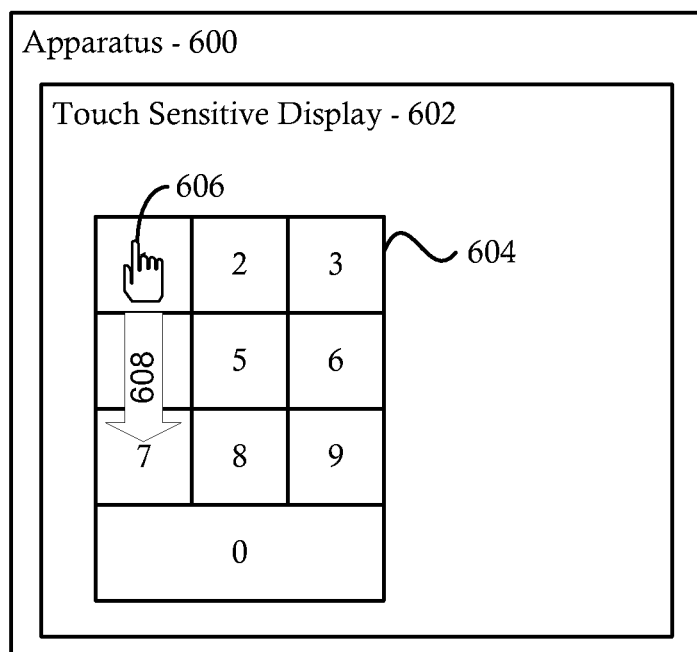
FIG. 6 illustrates an apparatus in accordance with an embodiment.

Referring now to FIG. 6, another example of an apparatus 600 is illustrated in accordance with the present disclosure. The apparatus 600 may include similar components to those discussed with reference to FIG. 1. Again, for the sake of clarity, various components have been obscured. In FIG. 6, the apparatus 600 includes a touch sensitive display 602 configured to display a number keypad 604.

The apparatus 600 may be configured to detect a contact 606 with the touch sensitive display 602. Based on the contact lasting longer than a predefined amount of time, for example two seconds, the apparatus 600 may determine that a user wishes to reorganize the number keypad 604. Other predefined amounts of time are contemplated. In response to the apparatus 600 determining that the contact has lasted longer than a predefined amount of time, the touch sensitive display 604 may display a visual cue 608 to communicate a predefined path for moving the first number key to the second location.

A visual cue may be a predefined image configured to inform a user of the device of a path for moving the number key. As illustrated, visual cue 608 is an arrow. The arrow illustrates a predefined path from the top, left corner of the number keypad 604 to the low, left corner of the number keypad 604.

In response to detecting the contact with the touch sensitive display 602, the apparatus may move the first key of the number keypad displayed on the touch sensitive display 602 in accordance with movement of the contact 606 along the visual cue 608 to a second location. In response to the first key reaching the second location, the apparatus 600 may arrange a second key of the number keypad based on the movement of the first key to the second location. For example, since the first key was moved from the top, left corner of the number keypad 604, the remaining keys representing numbers two and three, may be automatically arranged. In this manner, the apparatus 600 may efficiently switch between a first keypad layout corresponding to, for example, a telephonic keypad layout, to a second keypad layout corresponding to, for example a keyboard layout.

Referring now to FIGS. 7A-7L, various number keypad layouts are illustrated. The number keypad layouts may be displayed on a touch sensitive display as described with reference to FIGS. 1-6. In various embodiments, a user may arrive at one of the keypad layouts using any of the gestures described with reference to FIGS. 1-6. Other layouts are contemplated, for example, layouts with various number keys disposed in non-contiguous positions relative to the number keypad.

Referring now to FIGS. 8-11, flow diagrams are illustrated in accordance with the present disclosure. The flow diagrams illustrate methods or operations that may be performed by any of the apparatuses described with reference to FIGS. 1-6. While the flow diagrams are illustrated in a particular order, the order is not to be construed as requiring that they are performed in that order. Rather, the order is merely for purposes of illustration and ease of understanding. Those of ordinary skill in the art will understand that various elements may be performed simultaneously, or in other orders. Further, those of ordinary skill in the art will understand that not all elements are required for each and every embodiment.

Figures 8, 9:
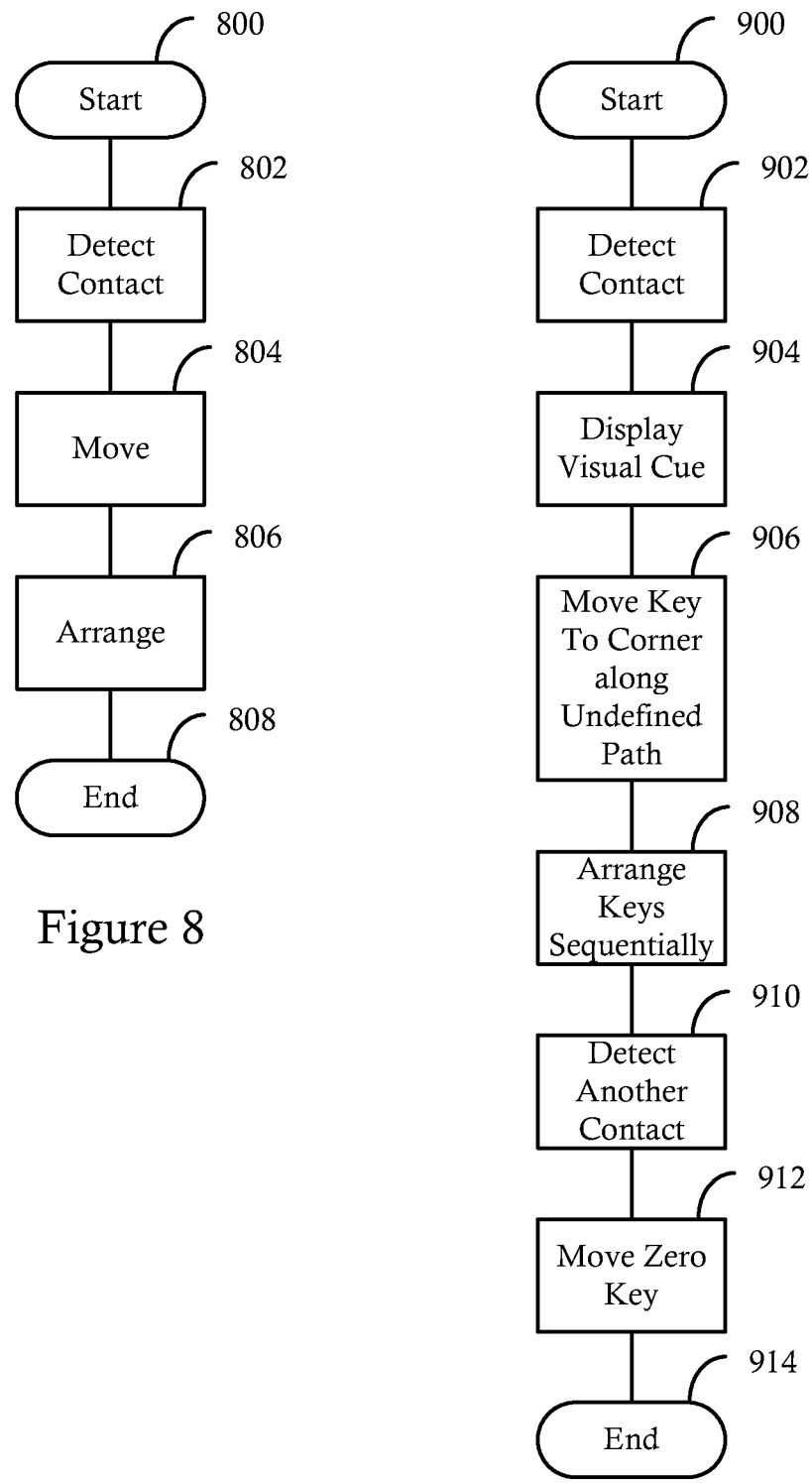
FIGS. 8-11 illustrate flow diagrams in accordance with various embodiments.

Referring to FIG. 8, the flow diagram may begin at 800 and progress to 802 where an apparatus may detect a contact with a touch sensitive display at a first location, wherein the first location corresponds to a first number key of a number keypad. In various embodiments, detecting the contact may include determining that a contact has remained on the touch sensitive display for a predefined period of time.

The flow diagram may then continue to 804 where the apparatus may move the first number key on the touch sensitive display in accordance with movement of the contact to a second location, for example as indicated by arrow 112 of FIG. 1. The second location may be different than the second condition. In various embodiments the second location may be one of the corners of the number keypad. The apparatus may provide a predefined path to the second location, or alternatively, may enable the user to move the first number key along an undefined path.

Upon the first number key arriving at the second location, which may be determined by an algorithm that determines a distance from a plurality of locations, and/or an amount of time the contact remains at a location, the apparatus may arrange other number keys of the number keypad based on the second location and a direction of movement of the contact after the first key has reached the second location at 806. A direction of movement may be determined by monitoring movement of the contact. The other keys may include all the remaining unmoved keys, or alternatively, a subset of the remaining unmoved keys. The method may end at 808.

Referring now to FIG. 9, another example is illustrated in accordance with the present disclosure. The method may begin at 900 and progress to 902 where an apparatus may detect a contact with a touch sensitive display. Detection may be determined based upon a contact remaining at a location longer than a predetermined amount of time.

Upon detecting a contact, the apparatus via the touch sensitive display may display a visual cue at 904. A visual cue may inform a user of possible paths to move a number key associated with the contact. The visual cue may be in the form of a channel or arrow along which the contact should follow. Alternatively, the visual cue may provide possible paths to second locations and enable a user to move the contact along an undefined path to the second location at 906.

Based on the second location of the number key associated with the contact, the apparatus may arrange other keys sequentially at 908. The arrangement may include sequentially aligning numbers from left to right, right to left, top to bottom, or bottom to top. The alignment of numbers may be based on the second location of the first number key.

After the arrangement of all or a subset of the remaining unmoved keys, those keys other than the first number key, the apparatus may detect another contact at 910. The second contact may include an attempt to move a zero key. Based on the second contact, a user may move the zero key at 912 to a user defined position. The method may end at 914.

Figure 10:
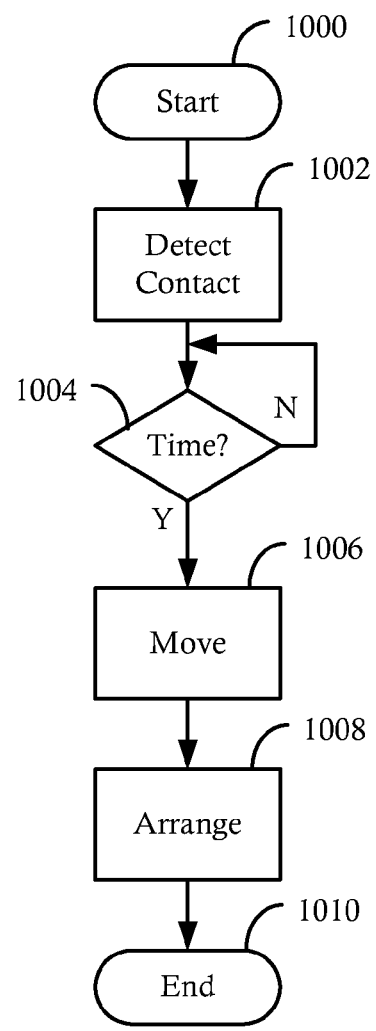

Referring to FIG. 10, another example of a flow diagram is illustrated in accordance with the present disclosure. The flow diagram begins at 1000 and progress to 1002 where an apparatus may detect a contact 1002. At 1004, the apparatus may determine whether a period of time has expired while monitoring the detected contact. If a predefined period of time has not expired, it may continue monitoring. Alternatively, if a period of time has expired, the flow diagram may continue to 1006, where the apparatus may move the first key of the number keypad displayed by the touch sensitive display in accordance with movement of the contact to a second location.

Based on the movement of the first key to the second location, the apparatus may arrange a second key of the number keypad. Arranging the second key of the number keypad may include moving the second key from one row and column to another row and column. The method may then end at 1010.

Figure 11:
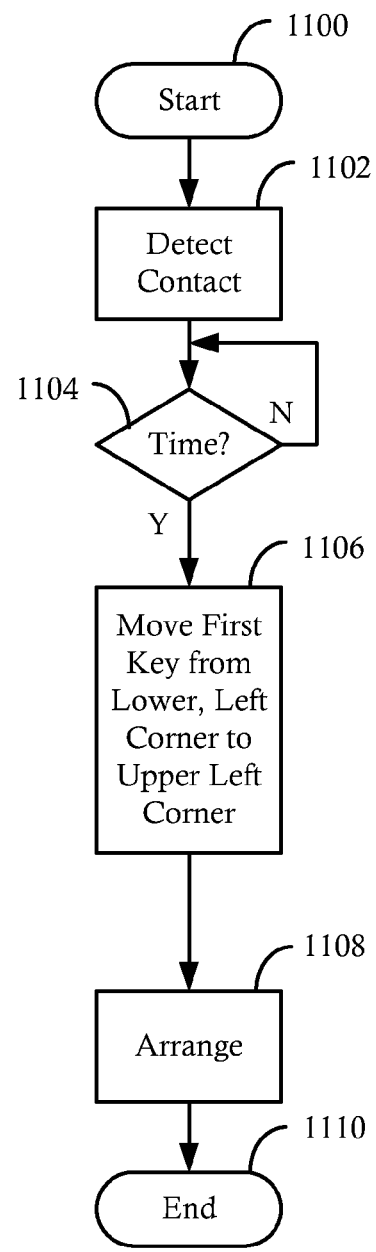

Referring to FIG. 11 another example flow diagram is illustrated in accordance with the present disclosure. The method may begin at 1100 and progress to 1102 where an apparatus may detect a contact. Once a contact is detected, an apparatus may determine if the contact has remained for a predefined period of time at 1104. Determine whether a predefined period of time has elapsed may enable the apparatus to distinguish a command to reorganize the number keypad from a command to enter a number. If the period of time has not expired, the apparatus continue to monitor the contact at 1104.

If the predetermined amount of time has expired, the method may continue to 1106 where the apparatus may move a first number key from a lower, left corner to an upper left corner of the number keypad. Such movement may facilitate a reorganization of a number keypad having a layout associated with a computing device to a layout associated with a telephonic interface.

After the first key has arrived at the upper, left corner of the keypad, the flow diagram may continue to 1108, where the apparatus may arrange any remaining numbers correspondingly. Such arrangement may include interchanging the keys representing two and three with the keys representing eight and nine, thereby arranging a subset of all remaining unmoved keys. The method may then end at 1110.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope of this disclosure. Those with skill in the art will readily appreciate that embodiments may be implemented in a wide variety of ways. This application is intended to cover any adaptations or variations of the embodiments discussed herein. Therefore, it is manifestly intended that embodiments be limited only by the claims and the equivalents thereof.

What is claimed is:
1. An apparatus, comprising:
 a touch sensitive display;
 a processor coupled to the touch sensitive display; and
 a memory coupled to the processor, the memory including a plurality of programming instructions that upon execution by the processor cause the processor to:
  detect a contact with the touch sensitive display at a first location, wherein the first location corresponds to a first key of a keypad displayed by the touch sensitive display;
  move the first key of the keypad displayed by the touch sensitive display in accordance with movement of the contact to a second location;
  determine a direction of movement of the contact from the first location to the second location after the first key reaches the second location; and
  arrange a second key of the keypad at another location in a same direction of movement as the determined direction of movement of the contact from the first location to the second location after the first key reaches the second location, detect another contact with the touch sensitive display at a third location, wherein the third location corresponds to a zero number key of the number keypad; and move the zero number key on the touch sensitive display in accordance with movement of the another contact to a fourth location.

2. The apparatus of claim 1, wherein the second location is a corner of the touch sensitive display.

3. The apparatus of claim 1, wherein the movement of the contact to the second location is along an undefined path.

4. The apparatus of claim 1, wherein the plurality of programming instructions, when executed by the processor, further cause the processor to arrange a third key of the keypad.

5. The apparatus of claim 1, wherein the plurality of programming instructions, executed by the processor, further cause the processor to:
display a visual cue to communicate a predefined path for moving the first key to the second location.

6. The apparatus of claim 1, wherein the first location corresponds to an upper, left corner of the touch sensitive display, and the second location corresponds to a lower, left corner the keypad displayed by the touch sensitive display.

7. The apparatus of claim 6, wherein the direction of movement of the contact after the first key reaches the second location is toward the lower, right corner of the keypad displayed by the touch sensitive display.

8. A method, comprising:
detecting a contact with a touch sensitive display at a first location, wherein the first location corresponds to a first key of a keypad displayed by the touch sensitive display;
moving the first key of the keypad displayed by the touch sensitive display in accordance with movement of the contact to a second location;
determining a direction of movement of the contact from the first location to the second location after the first key reaches the second location; and
arranging a second key of the keypad at another location in a same direction of movement as the determined direction of movement of the contact from the first location to the second location after the first key reaches the second location detect another contact with the touch sensitive display at a third location, wherein the third location corresponds to a zero number key of the number keypad; and move the zero number key on the touch sensitive display in accordance with movement of the another contact to a fourth location.

9. The method of claim 8, wherein the moving comprises moving the contact along an undefined path.

10. The method of claim 8, wherein the moving comprises moving the first number to a corner location on the touch sensitive display.

11. The method of claim 8, wherein the arranging comprises sequentially aligning the second key in accordance with the direction of movement of the contact to the second location after the first key reaches the second location.

12. The method of claim 8, further comprising:
displaying a visual cue to communicate a predefined path for moving the first key to the second location.

13. An article of manufacture comprising a non-transitory computer readable medium having a plurality of programming instructions stored thereon, wherein the plurality of programming instructions, when executed by a computing device, cause the computing device to:
detect a contact with a touch sensitive display at a first location, wherein the first location corresponds to a first key of a keypad displayed by the touch sensitive display;
move the first key of the keypad displayed by the touch sensitive display in accordance with movement of the contact to a second location;
determine a direction of movement of the contact from the first location to the second location after the first key reaches the second location; and
arrange a second key of the keypad at another location in a same direction of movement as the determined direction of movement of the contact from the first location to the second location after the first key reaches the second location, detect another contact with the touch sensitive display at a third location, wherein the third location corresponds to a zero number key of the number keypad; and move the zero number key on the touch sensitive display in accordance with movement of the another contact to a fourth location.

14. The article of manufacture of claim 13, wherein the keypad is a number keypad, and wherein the first key corresponds to a digit one.

15. The article of manufacture of claim 13, wherein the first location corresponds to a lower, left corner of the keypad displayed by the touch sensitive display.

16. The article of manufacture of claim 13, wherein the second location corresponds to an upper, left corner of the keypad displayed by the touch sensitive display.

17. The article of manufacture of claim 13, wherein to cause the computing device to detect a contact with a touch sensitive display at a first location, the plurality of programming instructions are to further cause the computing device to detect the contact for a period of time, wherein the period of time is greater than two seconds.

* * * * *

UNITED STATES PATENT AND TRADEMARK OFFICE
CERTIFICATE OF CORRECTION

| | | |
|---|---|---|
| PATENT NO. | : 9,182,909 B2 | Page 1 of 1 |
| APPLICATION NO. | : 13/095144 | |
| DATED | : November 10, 2015 | |
| INVENTOR(S) | : Akihiko Ikeda | |

It is certified that error appears in the above-identified patent and that said Letters Patent is hereby corrected as shown below:

In The Claims

In column 7, line 47, in Claim 11, delete "first number" and insert -- first key --, therefor.

Signed and Sealed this
Fifth Day of April, 2016

Michelle K. Lee
*Director of the United States Patent and Trademark Office*